United States Patent [19]

Maturi et al.

[11] Patent Number: 5,731,850
[45] Date of Patent: Mar. 24, 1998

[54] HYBRID HIERARCHIAL/FULL-SEARCH MPEG ENCODER MOTION ESTIMATION

[76] Inventors: Gregory V. Maturi, 2062 Paseo del Oro, San Jose, Calif. 95124; Vivek Bhargava, 1508 Fujiko Dr., San Jose, Calif. 95131; Sho Long Chen, 14411 Quito Rd., Saratoga, Calif. 95070; Ren-Yuh Wang, 1121 Buckingham Dr., Los Altos, Calif. 94024

[21] Appl. No.: 485,030

[22] Filed: Jun. 7, 1995

[51] Int. Cl.$^6$ .............................. H04N 7/36; H04N 7/50
[52] U.S. Cl. ................................. 348/699; 348/416
[58] Field of Search ............................ 348/416, 699; H04N 7/36, 7/50

[56] References Cited

U.S. PATENT DOCUMENTS

| | | | |
|---|---|---|---|
| 5,134,478 | 7/1992 | Golin | 348/415 |
| 5,144,424 | 9/1992 | Savatier | 348/405 |
| 5,144,429 | 9/1992 | Haghiri et al. | 348/416 |
| 5,193,004 | 3/1993 | Wang et al. | 348/413 |
| 5,200,820 | 4/1993 | Gharavi | 348/416 |
| 5,247,363 | 9/1993 | Sun et al. | 348/616 |
| 5,301,019 | 4/1994 | Citta | 348/416 |
| 5,889,108 | 8/1994 | Coleman et al. | 348/408 |

OTHER PUBLICATIONS

EDDY, Chris. "The MPEG Compression Algorithm". *PC Graphics & Video*. Jul. 1994, pp. 52–55.

MPEG Software Simulation Group. "MPEG-2 Encoder/Decoder" Version 1.1, Jun. 1994. MPEG-L@netcom.com.

MPEG Software Simulation Group. "Makefile for mpeg2encode." 1994. MPEG-L@netcom.com.

"ISO/IEC 13818-2:1995(E)" Recommendation ITU-TH.262 (1995E). 1995.

"ISO/IEC/JTC1/SC29/WG11 Coded Representation of Picture and Audio Information. Test Model 5" Document AVC-491. Version 1. Apr. 1993.

*Primary Examiner*—Howard W. Britton
*Attorney, Agent, or Firm*—Donald E. Schreiber

[57] ABSTRACT

An apparatus and method for determining inter-frame motion during compression of digital video data incorporates a computationally efficient hierarchical block-matching motion estimation technique in conjunction with a full-search block-matching approach. In the hierarchical block-matching method, a macroblock is filtered and decimated, and a search area is also filtered and decimated. A block-matching search is performed within the filtered and decimated search area. An augmented block in the original search area that corresponds to the block in the decimated search area that provided the best match with the decimated macroblock is then compared with the original macroblock to determine a motion vector. Operating parameters specify the search range based on the type of frame being processed, i.e. P-frame or B-frame, and, in the case of B-frames, the distance of the B-frame from the reference frame. If the operating parameters specify a search range above an established threshold, the hierarchical block-matching search is performed. If the operating parameters specify a search range equal to or below the established threshold, the full-search block-matching search is performed.

17 Claims, 6 Drawing Sheets

HYBRID HIERARCHIAL/FULL-SEARCH MPEG ENCODER MOTION ESTIMATION

BACKGROUND OF THE INVENTION

1. Field of the Invention

The present invention pertains to video image compression. Specifically, the present invention pertains to an apparatus and method for determining the inter-frame movement of macroblocks.

2. Description of the Prior Art

MPEG is a video signal compression standard, established by the Moving Picture Experts Group ("MPEG") of the International Standardization Organization. MPEG is a multistage algorithm that integrates a number of well known data compression techniques into a single system. These include motion-compensated predictive coding, discrete cosine transform ("DCT"), adaptive quantization, and variable length coding ("VLC"). The main objective of MPEG is to remove redundancy which normally exists in the spatial domain (within a frame of video) as well as in the temporal domain (frame-to-frame), while allowing inter-frame compression and interleaved audio. An MPEG-1 decoder is specified in ISO Recommendation ITU-T H.262 (1995E), dated January 1995. A prototype MPEG-2 encoder is specified in the ISO document "Test Model 5", Document AVC-491, Version 1, dated April, 1993, and a prototype software MPEG-2 encoder is published by the MPEG Software Simulation Group. The preceding ISO publications and the prototype software MPEG-2 encoder are hereby incorporated by reference.

There are two basic forms of video signals: an interlaced scan signal and a non-interlaced scan signal. An interlaced scan signal is a technique employed in television systems in which every television frame consists of two fields referred to as an odd-field and an even-field. Each field scans the entire picture from side to side and top to bottom. However, the horizontal scan lines of one (e.g., odd) field are positioned half way between the horizontal scan lines of the other (e.g., even) field. Interlaced scan signals are typically used in broadcast television ("TV") and high definition television ("HDTV"). Non-interlaced scan signals are typically used in computer systems and when compressed have data rates up to 1.8 Mb/sec for combined video and audio. The Moving Picture Experts Group has established an MPEG-1 protocol intended for use in compressing/ decompressing non-interlaced video signals, and an MPEG-2 protocol intended for use in compressing/ decompressing interlaced TV and HDTV signals.

Before a conventional video signal may be compressed in accordance with either MPEG protocol it must first be digitized. The digitization process produces digital video data which specifies the intensity and color of the video image at specific locations in the video image that are referred to as pels. Each pel is associated with a coordinate positioned among an array of coordinates arranged in vertical columns and horizontal rows. Each pel's coordinate is defined by an intersection of a vertical column with a horizontal row. In converting each frame of video into a frame of digital video data, scan lines of the two interlaced fields making up a frame of un-digitized video are interdigitated in a single matrix of digital data. Interdigitization of the digital video data causes pels of a scan line from an odd-field to have odd row coordinates in the frame of digital video data. Similarly, interdigitization of the digital video data causes pels of a scan line from an even-field to have even row coordinates in the frame of digital video data.

Figure 1:
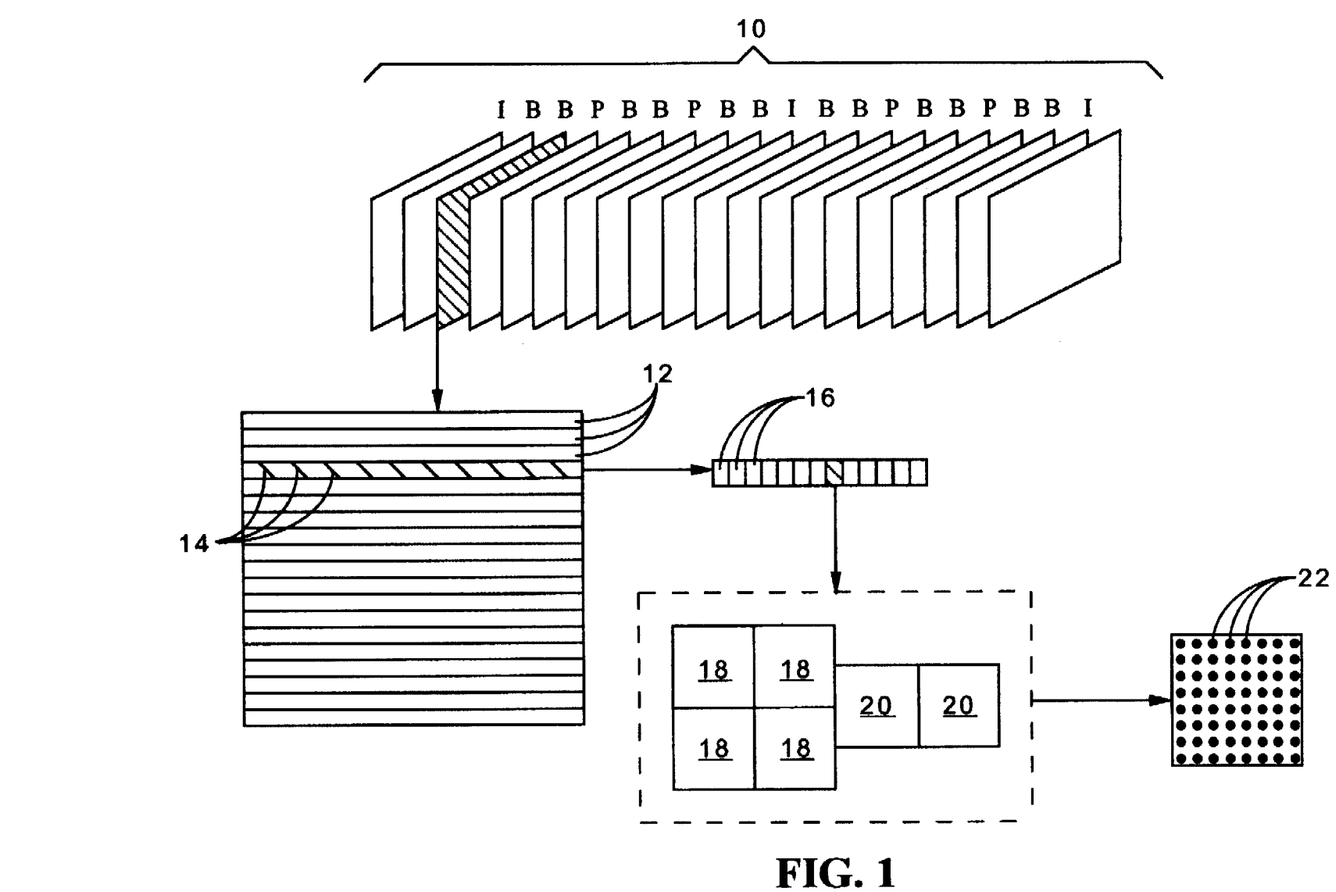
FIG. 1 is a block diagram showing the coding format of a video image according to an MPEG-2 protocol.

Referring to FIG. 1, MPEG-1 and MPEG-2 each divides a video input signal, generally a successive occurrence of frames, into sequences or groups of frames ("GOF") 10, also referred to as a group of pictures ("GOP"). The frames in respective GOFs 10 are encoded into a specific format. Respective frames of encoded data are divided into slices 12 representing, for example, sixteen image lines 14. Each slice 12 is divided into macroblocks 16 each of which represents, for example, a 16×16 matrix of pels. Each macroblock 16 is divided into 6 blocks including four blocks 18 relating to luminance data and two blocks 20 relating to chrominance data. The MPEG-2 protocol encodes luminance and chrominance data separately and then combines the encoded video data into a compressed video stream. The luminance blocks relate to respective 8×8 matrices of pels 21. Each chrominance block includes an 8×8 matrix of data relating to the entire 16×16 matrix of pels, represented by the macroblock 16. After the video data is encoded it is then compressed, buffered, modulated and finally transmitted to a decoder in accordance with the MPEG protocol. The MPEG protocol typically includes a plurality of layers each with respective header information. Nominally each header includes a start code, data related to the respective layer and provisions for adding header information.

There are generally three different encoding formats which may be applied to video data. Intra-frame coding produces an "I" block, designating a block of data where the encoding relies solely on information within a video frame where the macroblock 16 of data is located. Inter-frame coding may produce either a "P" block or a "B" block. A "P" block designates a block of data where the encoding relies on a prediction based upon blocks of information found in a prior video frame. A "B" block is a block of data where the encoding relies on a prediction based upon blocks of data from surrounding video frames, i.e., a prior I or P frame and/or a subsequent P frame of video data.

One means used to eliminate frame-to-frame redundancy is to estimate the displacement of moving objects in the video images, and encode motion vectors representing such motion from frame to frame. The accuracy of such motion estimation affects the coding performance and the quality of the output video. Motion estimation performed on a pel-by-pel basis has the potential for providing the highest quality video output, but comes at a high cost in terms of computational resources. Motion estimation can be performed on a block-by-block basis to provide satisfactory video quality with a significantly reduced requirement for computational performance.

U.S. Pat. No. 5,200,820, entitled "Block-Matching Motion Estimator for Video Coder" that issued Apr. 6, 1993 on an application filed Apr. 26, 1991 in the name of Hamid Gharavi ("the Gharavi patent"), discloses a method and apparatus for performing block-matching motion estimation in a video coder which estimates the motion vector associated with each block of pels in a current coding frame. In the method disclosed in the Gharavi patent, referred to herein as a "full-search" method, the motion vector for each block in the current frame is estimated by searching through a larger search window in the previous frame for a best match. At each possible shift position within the search window, a pel-by-pel absolute comparison is made between the intensity of the pels in the block in the current frame and the corresponding pels in the previous frame. Each pel is classified as either a matching pel or a mismatching pel depending on the pel difference and a threshold. The number of matching pels at each possible shift position is counted and the motion vector is determined from the shift position that yields the maximum number of matching pels.

Figure 3A:
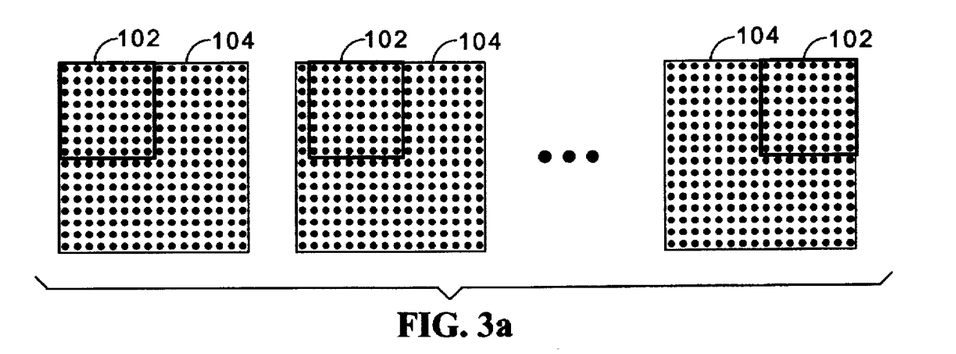
FIGS. 3a through 3c show of representative steps in a full-search block-matching motion estimation procedure.
Figure 3B:
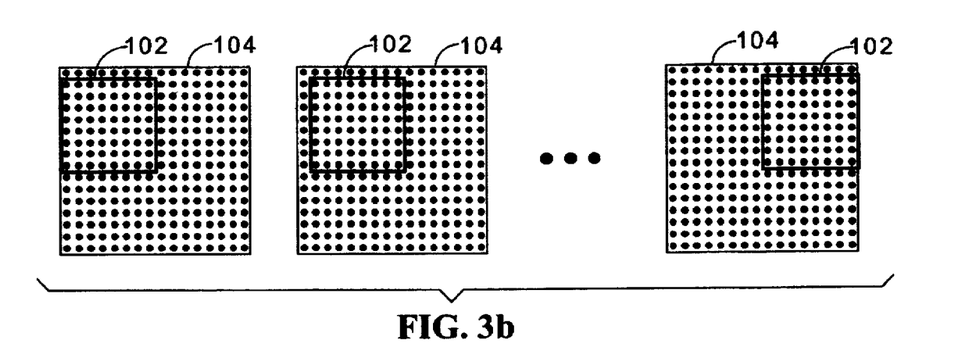
Figure 3C:
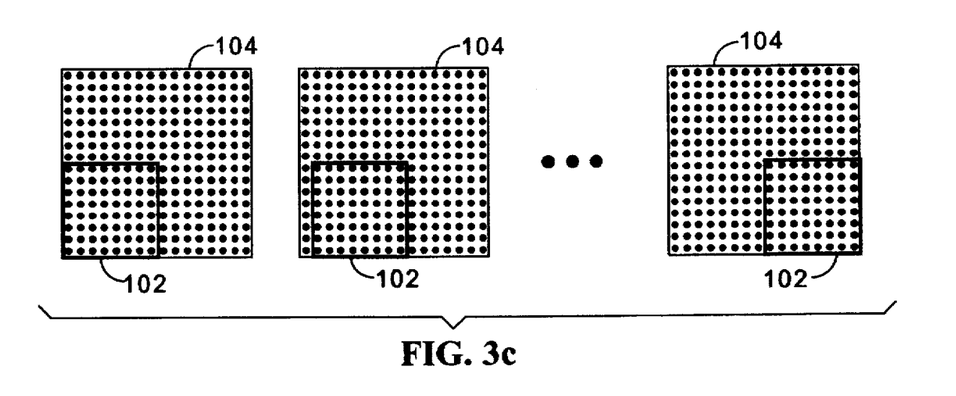

FIGS. 3a through 3c show representative steps in a full-search block-matching motion estimation method. In FIG. 3a, a 16×16 pel block 102 in the current frame (not illustrated in any of the FIGS.) is shown being compared with the upper-most and left-most corresponding position in a search window 104 of the reference frame (also not illustrated in any of the FIGS.) and moving to the upper-most and right-most position in the search window 104 of the reference frame. In FIG. 3b, the block 102 in the current frame is shown moved down one row in the search window 104 of the reference frame from the initial position shown in FIG. 3a. The progression continues down the search window 104 row by row until, as shown in FIG. 30, the block 102 in the current frame ultimately is compared with the lowest and right-most corresponding position in the search window 104 from the reference frame.

The block-matching method disclosed in the Gharavi patent is effective for reducing the computational load of motion estimation, without sacrificing video quality, as compared to a thorough pel-by-pel search across the entire frame. However, as can be deduced from FIGS. 3a through 3c, the block-matching procedure still relies on a "brute-force" horizontal, pel-by-pel, and vertical, line-by-line, search/comparison of the block in the current frame with corresponding block areas in the search window of the reference frame. The disclosed block-matching procedure therefore requires that the block in the current frame be compared, pel-by-pel, with every possible block position within the reference frame's search window. While representing an improvement in computational performance over a pure pel-by-pel comparison, the method disclosed in the Gharavi patent leaves room for possible further reduction in computation requirements, without noticeably sacrificing video quality. The disclosure of the Gharavi patent is incorporated herein by reference.

SUMMARY OF THE INVENTION

An object of the present invention is to provide an efficient motion estimation procedure for use in MPEG-2 video encoding systems.

Another object of the present invention is to provide an efficient motion estimation procedure that can take advantage of the high resolution capability of a full-search block-matching motion estimation method.

Yet another object of the present invention is to provide an efficient motion estimation procedure that can take advantage of the high performance capability of a hierarchical block-matching motion estimation method.

Yet another object of the present invention is to provide an efficient motion estimation procedure that can take advantage of both the high resolution capability of a full-search block-matching motion estimation method and the high performance capability of a hierarchical block-matching motion estimation method.

Yet another object of the present invention is to provide an efficient motion estimation procedure both for interlaced and for non-interlaced video.

Yet another object of the present invention is to provide an efficient motion estimation procedure that can provide an optimum blend of video quality and processor performance by taking advantage of both the high resolution capability of a full-search block-matching motion estimation method and the high performance capability of a hierarchical block-matching motion estimation method.

MPEG video requires billions of subtraction and addition operations per second for calculations of the minimum absolute difference (MAD) between a macroblock 16 and a corresponding block in a search region. These calculations can be reduced by using a hierarchical method of search applied to filtered decimated macroblocks and filtered decimated search regions. After performing this preliminary search, a search is performed on undecimated pels making up the best decimated match. This method of hierarchical search can be combined with a full-search over a smaller region to efficiently and accurately determine motion vectors.

A new method of motion estimation in accordance with the principles of the present invention includes the hierarchical block-matching search. The hierarchical search reduces the computations required for motion estimation, i.e., works faster than does the full-search block-matching method, but does not cause a noticeable reduction in video quality. The hierarchical search uses block-matching techniques by first performing a block search on a large area at a coarse resolution, and then by performing a second block search on a smaller area within the large area, and at a finer resolution.

The full-search block-matching and hierarchical block-matching methods represent two approaches to MPEG-2 motion estimation that are at somewhat opposite ends of a performance versus quality spectrum. The full-search method, on the one hand, provides more precise motion estimation but at a performance cost. The hierarchical method, on the other hand, provides faster searching while perhaps occasionally finding a less than optimum motion vector. The present invention provides a means to incorporate both methods in an MPEG-2 encoding system, to optimize the encoding process with respect to both performance and video quality, and in doing so, to reduce the amount of computing hardware required.

The decision of whether to perform a hierarchical search or a full-search preferably depends on the type of frame currently being processed, i.e. P-frame or B-frame, and, in the case of a B-frame, the distance of the B-frame being processed from the frame being used as a reference. The decision to employ a full-search block-matching or a hierarchical block-matching search is based on the resources, i.e. time and computing hardware, required to perform the search. For search frames "closer" to the reference frame(s), a block-matching full-search can be performed with the hardware available and in the required time. For search frames further from the reference frame(s), a hierarchical search will be performed to conserve computing hardware and perform the search within the required time.

In addition to accurately and efficiently estimating motion over larger areas, the preferred embodiment of the present invention similarly accurately and efficiently conforms motion estimation both to interlaced and to non-interlaced video. Field motion estimation is best suited to interlaced video. Conversely, frame motion estimation is best suited to non-interlaced video. However, moment by moment the type of video, i.e. interlaced or non-interlaced video, received by an encoder chip may change back and forth. To accommodate both types of video, the preferred embodiment of the present invention concurrently determines five (5) different independent motion vectors, i.e. a frame motion vector, an odd field—odd field motion vector, an even field—even field motion vector, an odd field—even field motion vector, and an even field—odd field motion vector. A significant difference between a macroblock's field motion vectors and its frame motion vector indicates that the digital video data being processed by the encoder chip is interlaced rather than non-interlaced.

DETAILED DESCRIPTION OF THE PREFERRED EMBODIMENT

Figure 2:
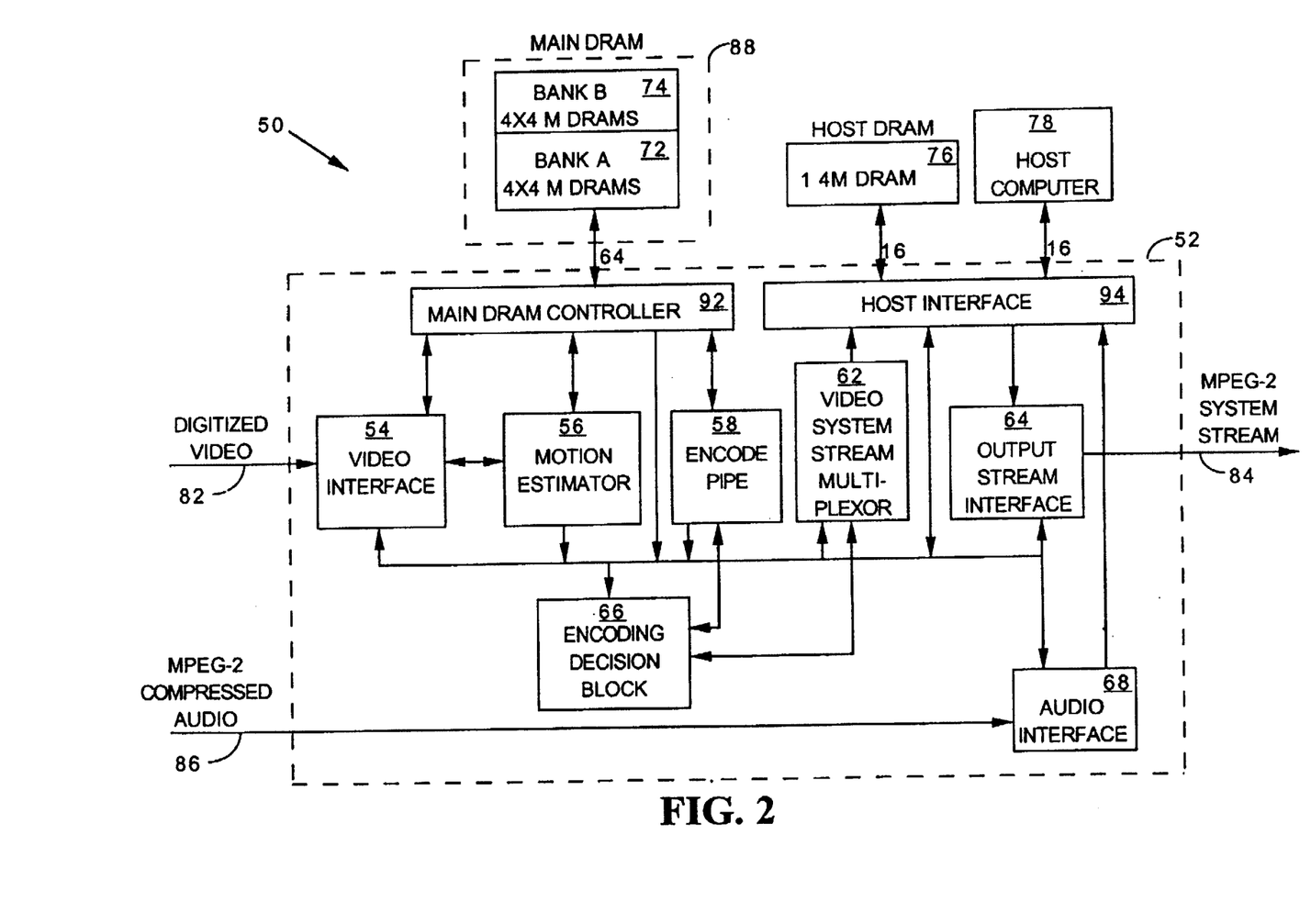
FIG. 2 is a block diagram showing an encoding system for generating video signals using the MPEG-2 protocol shown in FIG. 1.

Referring to FIG. 2, an MPEG-2 encoding system, referred to by the general reference character 50, is shown which employs the hybrid hierarchical/full-search block-matching motion estimation procedure of the present invention.

The Encoder Chip 52 accepts raw, digitized video data 82 in most standard formats and produces an MPEG-2 compressed video digital data stream (not illustrated in any of the FIGS.). The Encoder Chip 52 also accepts digital audio data 86 compressed in accordance with the MPEG-2 standard and combines the MPEG-2 compressed digital audio data 86 and compressed video data to produce an MPEG-2 System Stream 84.

The system components performing the functions necessary to produce the MPEG-2 System Stream 84 include: a Video Interface 54, Motion Estimator 56, Encode Pipe 58, Video System Stream Multiplexor 62, Output Stream Interface 64, Encoding Decision Block 66, Audio Interface 68, Main DRAM Controller 92 and Host Interface 94, all contained on the Encoder Chip 52; a Host Computer 78; a Host DRAM 76; and a Main DRAM 88 which includes a Bank A DRAM 72 and a Bank B DRAM 74.

The Video Interface 54 accepts digitized video data 82 directly into the MPEG-2 Encoder Chip 52 and may filter the digitized video data to reduce noise and to smooth the image by an amount appropriate for the resolution being used. In particular, the noise reduction and smoothing provided by the Video Interface 54 permits better matching between a macroblock 16 and a block in a search area. The MPEG-2 Encoder Chip 52 accepts component coded video data consisting of luminance (Y), and two color difference Cb and Cr. The Video Interface 54 may decimate the component video data thereby reducing the amount of data by combining data values for adjacent pels, i.e., the Video Interface 54 may perform a 4:2:2 to 4:2:0 decimation. The Video Interface 54 may be programmed to reduce noise in the digitized video data 82 by applying medial, spatial and temporal filters (not illustrated in any of the FIGS.) to that data. The Video Interface 54 also accepts, detects and eliminates 3/2 pulldown. Finally, the Video Interface 54 may also independently generate genlock.

Referring to both FIGS. 1 and 2, MPEG-2 encoded video data consists of GOFs 10. Each GOF 10 consists of one or more I-frames together with all of the P-frames and B-frames for which the I-frames serve as a reference. An MPEG-2 I-frame includes sufficient data to reproduce an entire uncompressed frame of video data without reference to any other data. An MPEG-2 P-frame may be decoded to obtain an entire uncompressed frame of video data only by reference to a prior decoded I-frame or by reference to a prior decoded P-frame. An MPEG-2 B-frame may be decoded to obtain an entire uncompressed frame of video data by reference to only a prior reference frame, to only a subsequent reference frame, or both to a prior and to a subsequent reference frame, i.e. By reference to a decoded I-frame or P-frame(s).

One of the processing steps required for encoding video data into P-frames and B-frames includes subdividing the digitized video data into macroblocks b6. Each macroblock 16 consists of a 16×16 pel array of digitized video data. The Motion Estimator 56 included in the MPEG-2 Encoder Chip 52 determines the direction and amount of motion between macroblocks 16 belonging to different frames of the video data being encoded.

The Encoding Decision Block 66 performs macroblock 16 intra/inter/Q decisions, makes field and frame decisions, and performs rate control, half-pel motion estimation and video buffer verifier (VBV) calculations.

The Encode Pipe 58 encodes macroblocks 16. Based either on results from the Encoding Decision Block 66, or based upon parameters specified via the Host Interface 94, the Encode Pipe 58 accepts digitized video data 82 together with data produced by the Encoding Decision Block While the Motion Estimator 56 determines motion vectors and the Encoding Decision Block 66 selects an encoding mode by processing 16×16 macroblocks 16, the Encode Pipe 58 transforms the digitized video data and quantizes the transformed video data by processing 8×8 blocks 18 and 20. Each 8×8 block 18 or 20 is transformed by computing DCT coefficients, and then the coefficients thus computed are quantized to further reduce the amount of data. If an inter macroblock cannot be adequately encoded simply by motion vectors alone, a DCT is computed of the difference between its reference frame(s) or field(s) and the macroblock's video data, and the DCT coefficients obtained for this difference macroblock are quantized. If P-frame(s) provide the difference for an inter macroblock, then the DCT is computed of the difference between the macroblock's video data and the decoded P-frame data to obtain the maximum accuracy in the macroblock's encoding. The transformed, quantized data thus obtained are then coded efficiently into an MPEG-2 video stream using variable length coding (VLC). Huffman coding. The Encode Pipe 58 also performs the inverse of these operations simultaneously on P-frame encoded data.

An MPEG-2 system stream 84 consists primarily of interleaved packets of data extracted from an MPEG-2 compressed video bitstream and from an MPEG-2 compressed digital audio data 86 bitstream together with header data that is essential for correctly decoding the compressed bitstreams. The MPEG-2 system stream 84 may also include interleaved packets of auxiliary data together with the packets extracted from the MPEG-2 compressed digitized video data 82 and digital audio data 86 bitstreams. The Video System Stream Multiplexer 62 packs header data around packets of data extracted from the MPEG-2 compressed digitized video data 82 and digital audio data 86. The Video System Stream Multiplexor 62 gathers header data for each packet of MPEG-2 compressed video from other components of the encoder chip 52, and generates data required for the MPEG-2 system stream's 84 system header and pack header.

The Audio Stream Interface 68 receives and buffers digital audio data 86 compressed in accordance with the MPEG-2 standard, before such compressed digital audio data 86 is combined with the MPEG-2 compressed video data in the Video System Stream Multiplexor 62.

In applications for the MPEG-2 Encoder Chip 52 which require transmission of a serial bitstream, the Output Stream Interface 64 generates and supplies such a serial bitstream. The Output Stream Interface 64 may supply a serial bitstream consisting of an MPEG-2 compressed digital audio data 86, an MPEG-2 compressed video stream, or a serial MPEG-2 system stream 84. The Output Stream Interface 64 supplies the selected bitstream at a rate specified by a clock which may either be internal or external to the MPEG-2 Encoder Chip 52. In generating and supplying the serial bitstream, the Output Stream Interface 64 automatically retrieves buffered MPEG-2 system stream, MPEG-2 Video stream, or MPEG-2 audio stream data from the host DRAM 76.

The Host Interface 94 controls timing and access of the MPEG-2 Encoder Chip 52 to the Host DRAM 76, and also provides a path by which the Host Computer 78 may supervise and control the Encoder Chip's 52 operation. The Host Interface's 94 ability to access the Host Dram 76 provides the Encoder Chip 52 with a path to the Host Dram 76 for storing MPEG-2 system stream 84 output data, and for receiving MPEG-2 auxiliary stream input data and/or MPEG-2 audio stream data.

The Main Dram Controller 92 provides timing both for overall control of the Encoder Chip 52, and controls the operation of a dedicated Main DRAM 88 that is accessed by the Encoder Chip 52 via a 64 bit wide bus. The Main DRAM Controller 92 includes a smart sequencer that automatically accesses the dedicated Main DRAM 88 to supply data as needed to the other components included on the MPEG-2 Encoder Chip 52. To provide the most efficient storage of pictures together with sufficient bandwidth for motion estimation, the dedicated Main DRAM 88 has two independent banks of DRAM, Bank A 72 and Bank B 74. Each Bank address accesses 8 pels of stored digitized video data, i.e. each address in the combined Bank A 72 and Bank B 74 accesses one macroblock 16 row of digitized video data. Both Bank A 72 and Bank B 74 of the Main DRAM 88 respectively include four (4) sets of DRAMs interleaved so sequential Bank addresses successively access a different set of DRAM. The MPEG-2 Encoder Chip 52 uses the Host DRAM 76 as a ninth DRAM primarily for intermediate storage (buffering) of encoded streams between their encoding and their output from the MPEG-2 Encoder Chip 52.

In the present invention, operating parameters are passed to the MPEG-2 Encoder Chip 52 from a Host Computer 78. The operating parameters specify how the Encoder Chip 52 should search for the motion vectors. If the operating parameters specify a hierarchical search, for each macroblock 16 the MPEG-2 Encoder chip scans up to a "64 pel search area in the reference video data at a coarse resolution, and then scans a smaller area at full resolution. If the operating parameters specify a full-search motion vector search, the MPEG-2 Encoder Chip 52 scans up to a ±32 pel search area in the reference video data. If the search range specified by the operating parameters falls into the ±32 pel search area range of the motion estimation hardware, the full-search occurs. Otherwise, the MPEG-2 Encoder Chip 52 performs the 2 step hierarchical search. The operating parameters may specify different search ranges for any combination of field, frame, different B-frames which indicates a distance from P-frames or I-frames, since every possible operating condition may not require processing the entire search area.

Figure 4A:
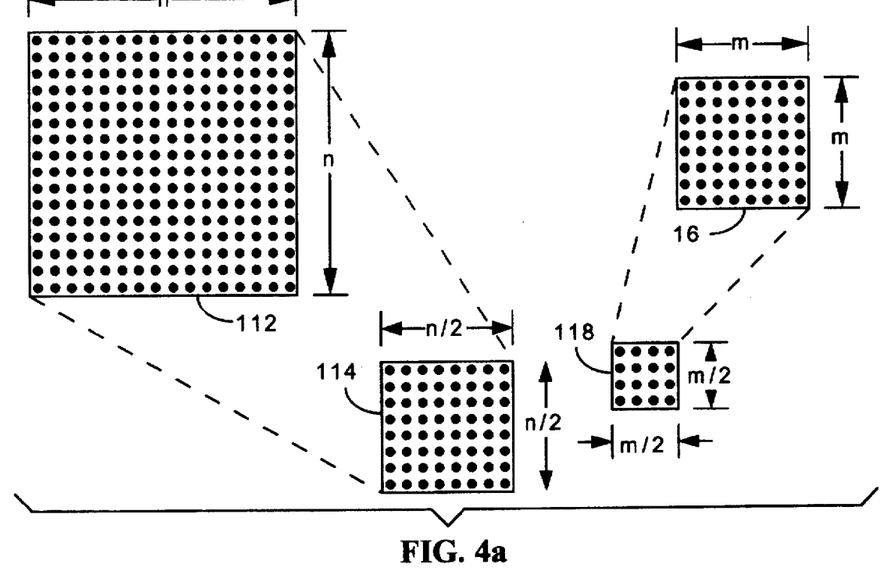
FIGS. 4a through 4c show a pictorial overview of a hierarchical block-matching motion estimation procedure.
Figure 4B:
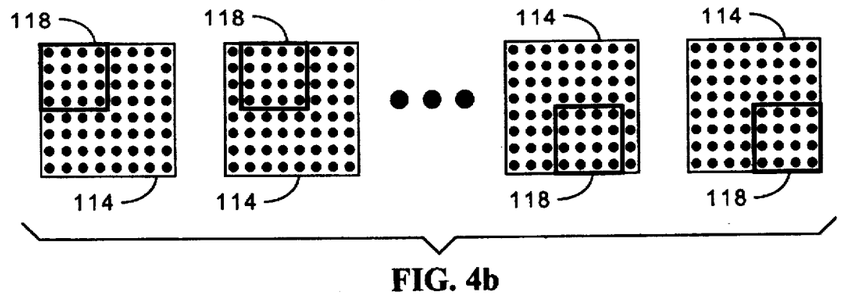
Figure 4C:
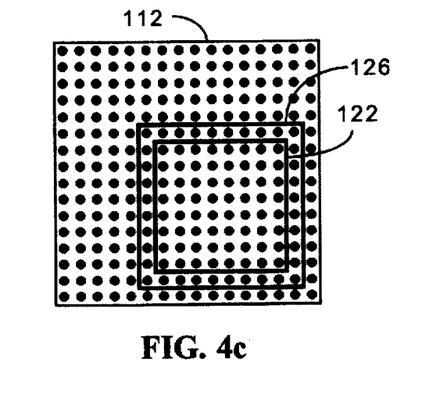

FIGS. 4a, 4b and 40 provide a pictorial overview of the hierarchical search method. In FIG. 4a, an n×n search area 112, e.g. 128×128 in a reference frame, is filtered and decimated down to an (n/2)×(n/2) hierarchical search area 114. An m×m macroblock 16, e.g. 16×16 is likewise filtered and decimated down to an (m/2)×(m/2) hierarchical search block 118. FIG. 4b illustrates performing a block search within the filtered and decimated (n/2)×(n/2) hierarchical search area 114 using the (m/2)×(m/2) hierarchical search block 118. The search of the (n/2)×(n/2) hierarchical search area 114 identifies the area that provides the best match for the (m/2)×(m/2) hierarchical search block 118. Because the original search area 112 has been filtered and decimated from an n×n area to the (n/2)×(n/2) hierarchical search area 114, and the m×m macroblock 16 has likewise been reduced to an (m/2)×(m/2) hierarchical search block 118, this first search yields a result having only one-half the resolution of the original n×n search area 112 and m×m macroblock 16.

Referring to FIG. 4c, an m×m region 122 within the n×n search area 112 corresponding to the (m/2)×(m/2) region in the (n/2)×(n/2) hierarchical search area 114 that provides the best match for the hierarchical search block 118 is then searched for the best match to the m×m macroblock 16. The region in the search window 104 that is searched is an (m+2)×(m+2) augmented block 126 surrounding the m×m region 122. The area to be searched is expanded from m'm to (m+2)×(m+2) because each pel in the filtered and decimated (n/2)×(n/2) hierarchical search area 114 represents a 2×2 pel area in the original n×n search area 112. Thus, when expanded, the pels in the rows and columns immediately adjacent to the m×m block 122 must be included in the second, full resolution search.

The resultant motion vector for the m×m macroblock 16 is equal to the difference in the position of the m×m macroblock 16 in the current frame and the m×m block in the reference frame which best matches the m×m macroblock 16 in the current frame.

Table 7-8 of the ISO MPEG-2 decoder specification, reproduced below, lists a set of maximum sizes for motion vectors that may be coded in an MPEG-2 video stream. Table 7-8 defines a set of f_codes, i.e. 1 through 9, which respectively specify the size of an area in the reference frame that is to be searched in determining a motion vector.

| f_code[s][t] | Vertical components (t=1) of field vectors in frame pictures | All other cases |
|---|---|---|
| 0 | (forbidden) | |
| 1 | [−4: +3.5] | [−8: +7.5] |
| 2 | [−8: +7.5] | [−16: +15.5] |
| 3 | [−16: +15.5] | [−32: +31.5] |
| 4 | [−32: +31.5] | [−64: +63.5] |
| 5 | [−64: +63.5] | [−128: +127.5] |
| 6 | [−128: +127.5] | [−256: +255.5] |

-continued

| f_code[s][t] | Vertical components (t=1) of field vectors in frame pictures | All other cases |
|---|---|---|
| 7 | [−256: +255.5] | [−512: +511.5] |
| 8 | [−512: +511.5] | [−1024: +1023.5] |
| 9 | [−1024: +1023.5] | [−2048: +2047.5] |
| 10–14 | (reserved) | |
| 15 | (Used when a particular f_code[s][t] will not be used) | |

In the presently preferred embodiment of the present invention the maximum search range for motion estimation is "64 pels, i.e. f_code=4. Searches covering ranges greater than ±32 pels use the hierarchical block-matching method, and searches covering ranges less than or equal to ±32 pels use a full-search block-matching method such as that disclosed in the Gharavi patent. These preceding limits result from the performance of the Encoder Chip 52 and amount of Main DRAM 88 available to support motion estimation. Greater search ranges may be used in accordance with the principles of the present invention as the performance of encoder chips improves and the size and cost of memory decreases.

The Motion Estimator 56 includes a group of five (5) f_code specification registers (not illustrated in any of the FIGS.) which store a set of f code specifications. The f_code specifications are downloaded to the Encoder Chip 52 from the Host Computer 78 during system initialization. The following table lists the correlation between each f code specification register and the control over motion estimation exercised by an f_code stored into such f_code specification register.

| Register Name | Applicable Frame | Distance from Reference Frame |
|---|---|---|
| f_code_0 | P-frame | (n/a) |
| f_code_1 | B-frame | +1 and −1 |
| f_code_2 | B-frame | +2 and −2 |
| f_code_3 | B-frame | +3 and −3 |
| f_code_4 | B-frame | +4 and −4 |

As indicated in the preceding table, the f_code_0 register stores the f_code that is used to determine the motion estimation search range for all P-frames. The f_code_1 register stores the f_codes used to determine the motion estimation search range for B-frames which are located either 1 frame before or 1 frame after the reference frame. Likewise, the f_code_2, f_code_3 and f_cod_4 registers store the f_codes used to determine the motion estimation search ranges for B-frames which are located 2, 3 or 4 frames, respectively, from (preceding or following) the reference frame. In the embodiment of the present invention, B-frames will always be within 4 frames of a reference frame. Also, in the embodiment of the present invention, two f_code values are stored in each of the f_code specification registers f_code_1, f_code_2, f_code_3, and f_code_4. Three bits of each f_code specification register identify the f_code to be used if the B-frame precedes the reference frame, and three bits identify the f_code to be used if the B-frame follows the reference frame. Because during initialization of the Encoder Chip 52 any valid f_code value may be loaded into the f_code specification register both for forward and for backward searching, a different f_code value may be specified for a forward search that is "n" frames ahead of the reference frame than the f-code value specified for a backward search that is "n" frames behind the reference frame.

Figure 7A:
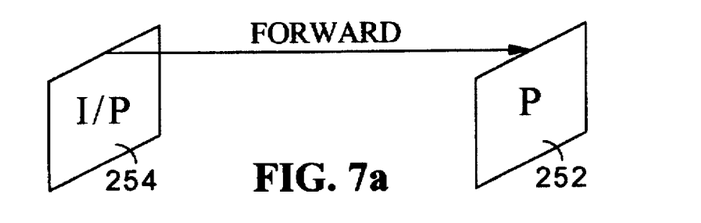
FIGS. 7a and 7b graphically depict the temporal relationships existing among I or P-frames and a B-frame that are to be processed for motion estimation.
Figure 7B:
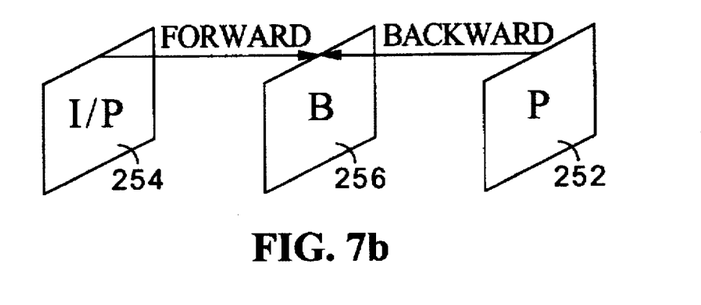

FIG. 7a graphically depicts the temporal relationship existing between a P-frame 252 to be processed in the forward direction for motion estimation with respect to a reference I-frame or P-frame 254. FIG. 7b graphically depicts the temporal relationships existing between a B-frame 256 to be processed for motion estimation in the forward direction with respect to the reference I-frame or P-frame 254, and also in the backward direction with respect to the second reference P-frame 252.

Figure 5:
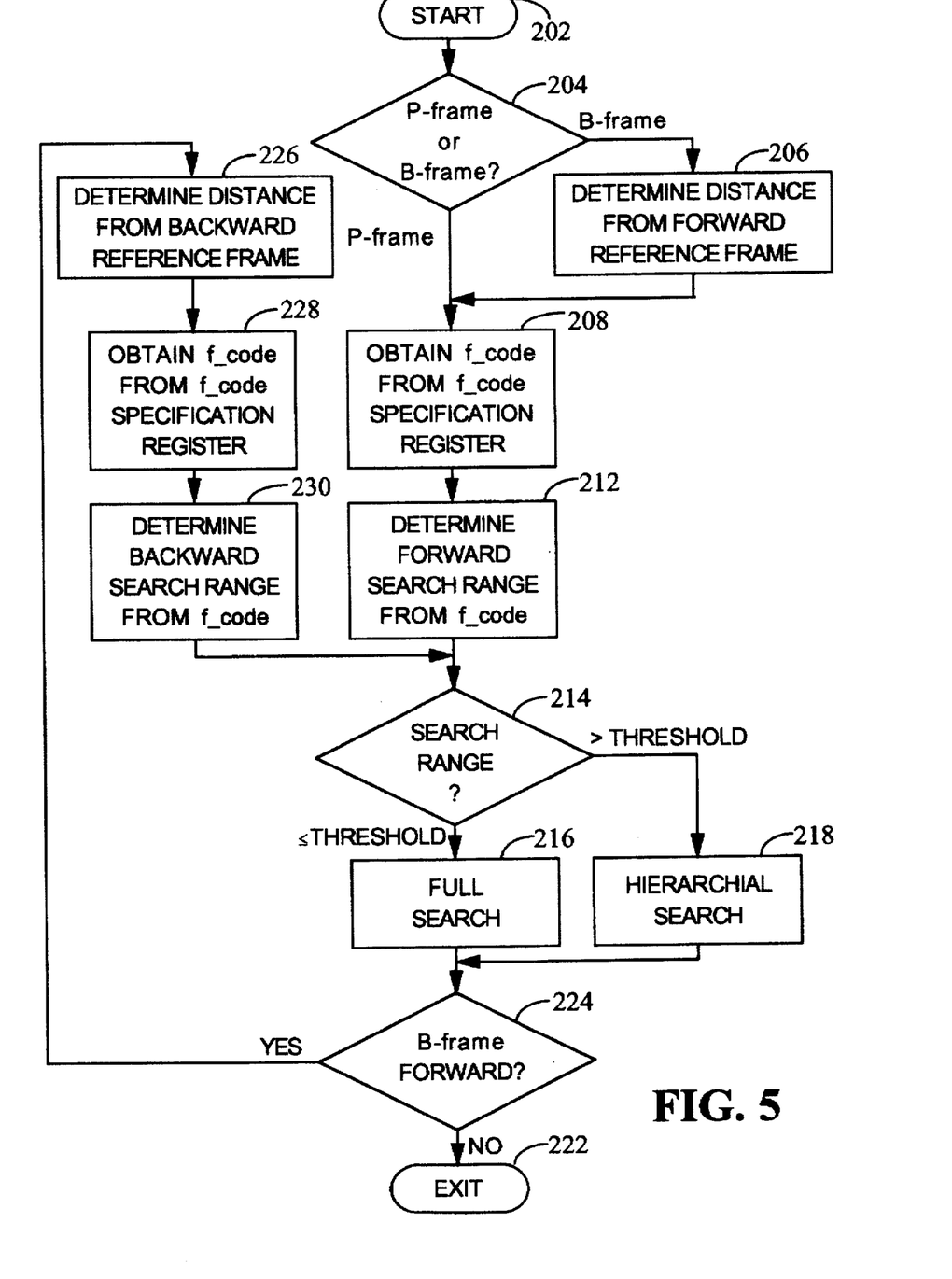
FIG. 5 shows a flow chart depicting a process for determining whether a hierarchical or a full-search will be used in determining motion vectors for a frame's macroblocks.

Thus as depicted in the flow chart of FIG. 5, the Motion Estimator 56 commences processing a current frame 252 or 256 of digital video data with respect to a particular reference frame 254 or frames 252 and 254 at a start block 202. In processing an entire frame of digital video data in the forward direction with respect to the reference frame 254, the Motion Estimator 56 first identifies the frame currently being processed either as the P-frame 252, or as the B-frame 256 in a decision block 204. If the current frame 252 or 256 is the B-frame 256, the Motion Estimator 56 then determines the distance of the current frame 256 from the forward reference frame 254 in a processing block 206. Regardless of whether the current frame is the P-frame 252 or the B-frame 256, in a processing block 208 the Motion Estimator 56 fetches a forward direction f_code from the appropriate f_code specification register as described above. Then in a processing block 212 the Motion Estimator 56 uses the retrieved forward direction f_code to establish a forward direction search range for macroblocks 16 of the current frame 252 or 256 in accordance with the ranges specified in Table 7–8 of the ISO MPEG-2 specification set forth above. If in a decision block 214 of the flow chart of FIG. 5 the Motion Estimator 56 determines that the search range thus established for the current frame 252 or 256 exceeds a pre-established threshold, then forward motion vectors for all the macroblocks 16 of the current frame 252 or 256 are determined using a hierarchical search in processing block 218. If, however, the search range established for the current frame 252 or 256 is less than or equal to the pre-established threshold, then the Motion Estimator 56 determines forward motion vectors for all the macroblocks 16 of the present frame using full-search as depicted in a processing block 216.

After all the macroblocks 16 in the current frame 252 or 256 have been processed either in block 216 or in block 218, the Motion Estimator 56 then determines in decision block 224 whether the present frame is the B-frame 256 that has been processed only in the forward direction. If the present frame is the B-frame 256 that has been processed only in the forward direction, then the Motion Estimator 56 in processing block 226 determines the distance of the current frame 256 from the backward reference frame 252. Then in processing block 228 the Motion Estimator 56 fetches a backward direction f_code from the appropriate f_code specification register as described above. In a processing block 232 the Motion Estimator 56 uses the retrieved backward direction f_code to establish a backward direction search range for macroblocks 16 of the current frame 256 in accordance with the ranges specified in Table 7–8 of the ISO MPEG-2 specification set forth above. If in the decision block 214 of the flow chart of FIG. 5 the Motion Estimator 56 determines that the search range thus established for the current frame 256 exceeds the pre-established threshold, then backward motion vectors for all the macroblocks 16 of the current frame 256 are determined using a hierarchical search in processing block 218. If, however, the search range established for the current frame 256 is less than or equal to the pre-established threshold, then the Motion Estimator 56 determines backward motion vectors for all the macroblocks 16 of the present frame using full-search as depicted in a processing block 216.

After the P-frame 252 has been processed only in the forward direction, or the B-frame 256 has been processed both in the forward and in the backward directions, the Motion Estimator 56 exits the motion estimation process for the current frame 252 or 256 via an exit block 222. In the presently preferred embodiment of the invention, the pre-established threshold is set at a search range of ±32 pels.

Those skilled in the art are familiar with various techniques for comparing pels during motion estimation searching in order to identify the block in the reference frame that most closely matches the block in the current frame. This includes techniques such as: simply comparing pel-by-pel and counting the number of absolute matches or mismatches; comparing the intensity of pels to determine the difference in their intensities, and then comparing the difference in intensity of the pels with a threshold to determine if the pels match or mismatch; taking a sum of absolute differences between pels to find a minimum sum of absolute difference between a macroblock 16 and a block within a search window; or taking a sum of squared differences between pels to find a minimum sum of squared difference between a macroblock 16 and a block within a search window. The use of the hybrid hierarchical/full-search block-matching motion estimation method of the present invention is compatible with these and other pel comparison methods used in motion estimation.

Figure 6:
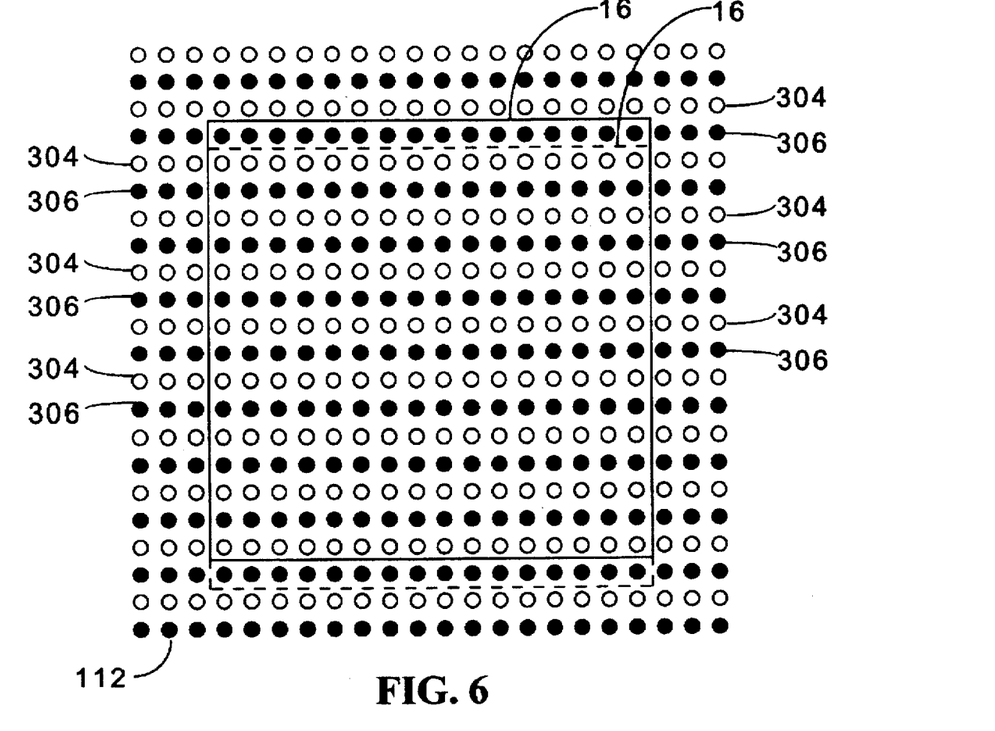
FIG. 6 illustrates a portion of a search area including odd numbered and even numbered rows of pels that are overlaid with an outline of a macroblock which encompasses a (16×16) pel block within the search area.

However, the preferred embodiment of the Motion Estimator 56 of the present invention computes sums of absolute differences ("SADs") both between pels of the hierarchical search block 18 and pels of the hierarchical search area 114, and between pels of the macroblock 16 and pels of the search area 112. Referring now to FIG. 6, depicted there are pels of a portion of the search area 112 overlaid with an outline of the macroblock 16 which encompasses a (16×16) pel block within the search area 112. In the illustration of FIG. 6, pels in rows 304 belonging to an odd field are depicted by open circles, while pels in rows 306 belonging to an even field are depicted by filled circles. In computing various SADs for the macroblock 16 not only does the Motion Estimator 56 determine a motion vector ("MV") for the minimum SAD for the entire macroblock 16, in searching for the best match for pels of the macroblock 16 the Motion Estimator 56 also concurrently determines independent minimum SADs and MVs for:
1. the odd-odd field, i.e. the odd rows 304 of the search area 112 and odd numbered rows of the macroblock 16;
2. the even-even field, i.e. the even rows 306 of the search area 112 and the even numbered rows of the macroblock 16;
3. the odd-even field, i.e. the odd rows 304 of the search area 112 and the even numbered rows of the macroblock 16; and
4. the even-odd field, i.e. the even rows 306 of the search area 112 and the odd numbered rows of the macroblock 16.

In computing SADs during full-search at each successive position of the macroblock 16 within the search area 112 or within the augmented block 126, the Motion Estimator 56 independently cumulates the SAD for the odd-odd field and the SAD for the even-even field and then merely adds these two SADs together rather than independently computing a SAD for the entire macroblock 16 at each such position. For the odd-even field and the even-odd field, the Motion Estimator 56 shifts the macroblock 16 down one row, as illustrated by a dashed line outline position 16' for the macroblock, and independently determines SADs for the odd-even field and the even-odd field. Again the Motion Estimator 56 adds the SAD for the odd-even field to the SAD for the even-odd field to obtain a SAD for the entire macroblock at the position 16'. While determining SADs at successive positions of the macroblock 16 throughout the search area 112 or throughout the augmented block 126, the Motion Estimator 56 maintains two independent minimum SADs and motion vectors for the macroblock 16 both at those positions where the SAD is computed by adding together odd-odd field and even-even field SADs, and at those positions where the SAD is computed by adding together odd-even and even-odd SADs. Only after exhausting the search for minimum SADs throughout the search area 112 or throughout the augmented block 126 does the Motion Estimator 56 select the minimum of these two SADs and motion vectors as being the minimum SAD and motion vector for the entire macroblock 16.

Consequently, after processing each macroblock 16 of the P-frame 252 throughout the search area 112 of the reference frame 254, the Motion Estimator 56 stores into the Host DRAM 76 for subsequent use by the Encoding Decision Block 66 only the forward MVs and SADs listed in the table below. Correspondingly, after processing each macroblock 16 of the B-frame 256 throughout the search areas 112 of the reference frames 252 and 256 the Motion Estimator 56 stores into the Host DRAM 76 for subsequent use by the Encoding Decision Block 66 both the forward and the backward MVs and SADs listed in the table below.

|  | Forward P-frame or B-frame | | | Backward B-frame | | |
| --- | --- | --- | --- | --- | --- | --- |
|  | Min. SAD | Hor. | Vert. | Min. SAD | Hor. | Vert. |
| Entire Macroblock | $SAD_m$ | $MVH_M$ | $MVV_M$ | $SAD_m$ | $MVH_M$ | $MVV_M$ |
| Odd–Odd Field | $SAD_{O-O}$ | $MVH_{O-O}$ | $MVV_{O-O}$ | $SAD_{O-O}$ | $MVH_{O-O}$ | $MVV_{O-O}$ |
| Even–Even Field | $SAD_{E-E}$ | $MVH_{E-E}$ | $MVV_{E-E}$ | $SAD_{E-E}$ | $MVH_{E-E}$ | $MVV_{E-E}$ |
| Odd–Even Field | $SAD_{O-E}$ | $MVH_{O-E}$ | $MVV_{O-E}$ | $SAD_{O-E}$ | $MVH_{O-E}$ | $MVV_{O-E}$ |
| Even–Odd Field | $SAD_{E-O}$ | $MVH_{E-O}$ | $MVV_{E-O}$ | $SAD_{E-O}$ | $MVH_{E-O}$ | $MVV_{E-O}$ |

A significant difference between the motion vectors for macroblocks 16 and those for the odd-odd field and the even-even field of the macroblocks 16 indicates that this is probably a frame digitized from an interlaced video signal. Conversely, little difference between the motion vectors for macroblocks 16 and those for the odd-odd field and the even-even field of the macroblocks 16 indicates that this is probably a frame digitized from a non-interlaced video signal.

Note that if hierarchical search has been used in processing block 218 of the flow chart presented in FIG. 5 to determine motion vectors for all the macroblocks 16 of the frame 252 or 256, the motion vectors tabulated above for each macroblock 16 must all lie within the augmented block 126 depicted in FIG. 4c. That is, in the presently preferred embodiment of the present invention the maximum difference respectively among the horizontal and among vertical components of all motion vectors determined for macroblocks 16 using hierarchical search cannot exceed two (2). Alternatively, in the presently preferred embodiment of the present invention the maximum difference respectively among the horizontal and among the vertical components of all motion vectors determined for macroblocks 16 using full search in the flow chart processing block 216 of FIG. 5 can be as large as sixty-three (63).

Although the present invention has been described in terms of the presently preferred embodiments, it is to be understood that such disclosure is purely illustrative and is not to be interpreted as limiting. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. In a digital video data compression scheme, a method of estimating the frame-to-frame motion of a block of pels in a video frame comprising the steps of:
    (a) filtering and decimating a block located at a position in a current frame thereby establishing a hierarchical search block;
    (b) forming a search area in a reference frame, with said search area in said reference frame surrounding the position of said block in said current frame;
    (c) filtering and decimating said search area in said reference frame thereby establishing a hierarchical search area;
    (d) comparing said hierarchical search block with a block within said hierarchical search area;
    (e) repeating step (d) for a plurality of blocks located at various positions within said hierarchical search area;
    (f) identifying that region within said hierarchical search area which best matches said hierarchical search;
    (g) forming an augmented block within said search area in said reference frame that surrounds a region in said search area in said reference frame that corresponds to said region within said hierarchical search area that was identified in step (f) as best matching said hierarchical search block;
    (h) comparing the pels in said block in said current frame with pels in a block in said augmented block in said reference frame;
    (i) repeating step (h) for a plurality of blocks located at various positions within said augmented block in said reference frame; and
    (j) establishing a motion vector for said block in said current frame equal to a difference between a position of that block in said current frame and a position in said augmented block in said reference frame which best matches said block in said current frame.

2. The method of estimating frame-to-frame motion of a block of pels in a video frame of claim 1 wherein said plurality of blocks located at various positions within said hierarchical search area includes all blocks within said hierarchical search area.

3. The method of estimating frame-to-frame motion of a block of pels in a video frame of claim 1 wherein said plurality of blocks located at various positions within said augmented block includes all blocks within said augmented block.

4. The method of estimating frame-to-frame motion of a block of pels in a video frame of claim 1 wherein a plurality of motion vectors are concurrently established including an odd-odd field motion vector, an even-even field motion vector, an odd-even field motion vector, and an odd-even field motion vector.

5. In a digital video data compression scheme, a method of estimating the frame-to-frame motion of a block of pels in a video frame comprising the steps of:
    (a) identifying a reference frame;
    (b) identifying a block located at a position in a current frame;
    (c) determining a size for a search area in said reference frame;
    (d) if the size of said search area in said reference frame is larger than an established threshold, then
        (i) filtering and decimating said block in said current frame thereby establishing a hierarchical search block;
        (ii) forming a search area in said reference frame, with said search area in said reference frame surrounding the position of said block in said current frame;
        (iii) filtering and decimating said search area in said reference frame thereby establishing a hierarchical search area;
        (iv) comparing said hierarchical search block with a block within said hierarchical search area;
        (v) repeating step (d) (iv) for a plurality of blocks located at various positions within said hierarchical search area;
        (vi) identifying that region within said hierarchical search area which best matches said hierarchical search block;
        (vii) forming an augmented block within said search area in said reference frame that surrounds a region in said search area in said reference frame that corresponds to said region within said hierarchical search area that was identified in step (d) (vi) as best matching said hierarchical search block;
        (viii) comparing the pels in said block in said current frame with pels in a block in said augmented block in said reference frame;
        (ix) repeating step (d) (viii) for a plurality of blocks located at various positions within said augmented block in said reference frame; and
        (x) establishing a motion vector for said block in said current frame equal to a difference between a position of that block in said current frame and a position in said augmented block in said reference frame which best matches said block in said current frame;
    (e) otherwise, if the size of said search area in said reference frame is equal to or less than said established threshold, then
        (i) forming a search window in said reference frame, with said search window in said reference frame surrounding the position of said block in said current frame;
        (ii) comparing the pels in said block in said current frame with pels in a block within said search window in said reference frame;

(iii) repeating step (e) (ii) for a plurality of blocks located at various positions within said search window in said reference frame;

(iv) establishing a motion vector for said block in said current frame equal to a difference between a position of that block in said current frame and a position in said search window in said reference frame which best matches said block in said current frame.

6. The method of estimating frame-to-frame motion of a block of pels in a video frame of claim 5 wherein said plurality of blocks located at various positions within said hierarchical search area includes all blocks within said hierarchical search area.

7. The method of estimating frame-to-frame motion of a block of pels in a video frame of claim 5 wherein said plurality of blocks located at various positions within said augmented block includes all blocks within said augmented block.

8. The method of estimating frame-to-frame motion of a block of pels in a video frame of claim 5 wherein said predetermined number of blocks within said search window in said reference frame comprises all blocks within said search window in said reference frame.

9. The method of estimating frame-to-frame motion of a block of pels in a video frame of claim 5 wherein a plurality of motion vectors are concurrently established including an odd-odd field motion vector, an even-even field motion vector, an odd-even field motion vector, and an odd-even field motion vector.

10. The method of estimating frame-to-frame motion of a block of pels in a video frame of claim 5 wherein said method of determining the size for a search area in said reference frame comprises the steps of:

(a) assigning a code to said current frame; and (b) determining the size of said search window based on the search range specified for said code.

11. The method of estimating frame-to-frame motion of a block of pels in a video frame of claim 10 wherein said step of assigning a code to said current frame comprises the steps of:

(a) obtaining a code from a table of codes; and (b) associating said code with said current frame.

12. The method of estimating frame-to-frame motion of a block of pels in a video frame of claim 11 wherein said step of obtaining a code from a table of codes comprises the steps of:

(a) determining whether said current frame is a P-frame or a B-frame;

(b) if said current frame is a P-frame, obtaining a code from a table of codes based on said current frame being a P-frame; and (c) if said current frame is a B-frame, obtaining a code from a table of codes based on said current frame being a B-frame.

13. The method of estimating frame-to-frame motion of a block of pels in a video frame of claim 12 wherein said step of obtaining a code from a table of codes based on said current frame being a B-frame comprises the step of obtaining a code from a table of codes based on the distance from said current frame to said reference frame.

14. The method of estimating frame-to-frame motion of a block of pels in a video frame of claim 12 wherein said step of obtaining a code from a table of codes based on said current frame being a B-frame comprises the step of obtaining a code from a table of codes based on whether said current frame precedes or follows said reference frame.

15. The method of estimating frame-to-frame motion of a block of pels in a video frame of claim 14 wherein said step of obtaining a code from a table of codes based on said current frame being a B-frame further comprises the step of obtaining a code from a table of codes based on the distance from said current frame to said reference frame.

16. In a digital video data compression apparatus, a motion estimation apparatus for estimating the frame-to-frame motion of a block of pels in a video frame comprising:

(a) means for filtering and decimating a block located at a position in a current frame for which motion is to be estimated thereby establishing a hierarchical search block;

(b) means for forming a search area in a reference frame, the search area surrounding the position of the block in the current frame;

(c) means for filtering and decimating the search area in the reference frame thereby establishing a hierarchical search area;

(d) means for successively comparing the hierarchical search block with various blocks in the hierarchical search area;

(e) means for identifying a specific block within the hierarchical search area which best matches the hierarchical search block;

(f) means for forming an augmented block within the search area in the reference frame which surrounds a region in the search area that corresponds to the region within the hierarchical search area which best matches the hierarchical search block;

(g) means for comparing pels in the block in the current frame with pels in various successive blocks in the augmented block;

(h) means for establishing a motion vector for the block in the current frame equal to a difference between a position of that block in the current frame and a position in the augmented block in the reference frame which best matches the block in said current frame.

17. In a digital video data compression apparatus, a motion estimation apparatus for estimating the frame-to-frame motion of a block of pels in a video frame comprising:

(a) means for identifying a reference frame;

(b) means for identifying a block located at a position in a current frame for which motion is to be estimated;

(c) means for determining a size for a search area in the reference frame;

(d) means for determining if the size of the search area exceeds an established threshold for regulating estimation of frame-to-frame motion;

(e) means for filtering and decimating a block in the current frame thereby establishing a hierarchical search block;

(f) means for forming a search area in the reference frame, the search area surrounding the position of the block in the current frame;

(g) means for filtering and decimating the search area in the reference frame thereby establishing a hierarchical search area;

(h) means for successively comparing the hierarchical search block with various blocks in the hierarchical search area;

(i) means for identifying a specific block within the hierarchical search area which best matches the hierarchical search block;

(j) means for forming an augmented block within the search area in the reference frame which surrounds a region in the search area that corresponds to the region within the hierarchical search area which best matches the hierarchical search block;

(k) means for comparing pels in the block in the current frame with pels in various successive blocks in the augmented block;

(l) means for establishing a motion vector for the block in the current frame equal to a difference between a position of that block in the current frame and a position in the augmented block in the reference frame which best matches the block in said current frame;

(m) means for forming a search window in the reference frame, with said search window in the reference frame surrounding the position of the block in the current frame;

(n) means for comparing pels in the block in the current frame with pels in various successive blocks in the search window in the reference frame; and (o) means for establishing a motion vector for the block in the current frame equal to a difference between a position of that block in the current frame and a position in the search window in the reference frame which best matches the block in the current frame.

* * * * *